June 24, 1930.  D. G. DUTY ET AL  1,765,760

SERVO MOTOR FOR BRAKES

Filed Oct. 6, 1927

INVENTORS
Dorsey G. Duty and
BY Roy P. Skerritt

Francis D. Hardesty
ATTORNEY.

Patented June 24, 1930

1,765,760

UNITED STATES PATENT OFFICE

DORSEY G. DUTY AND ROY P. SKERRITT, OF DETROIT, MICHIGAN

SERVO-MOTOR FOR BRAKES

Application filed October 6, 1927. Serial No. 224,307.

The present invention relates to servo-motors for the brakes of automotive vehicles, particularly such vehicles as are propelled by internal combustion engines.

Among the objects of the invention is to provide assistance to the operator in applying brakes and in holding them when applied.

Another object is means supplied with motive power from the engine of the vehicle to aid in or to supply the power for applying the brakes.

Other objects will readily occur to those skilled in the art upon reference to the following description and drawing in which:—

Figure 1:
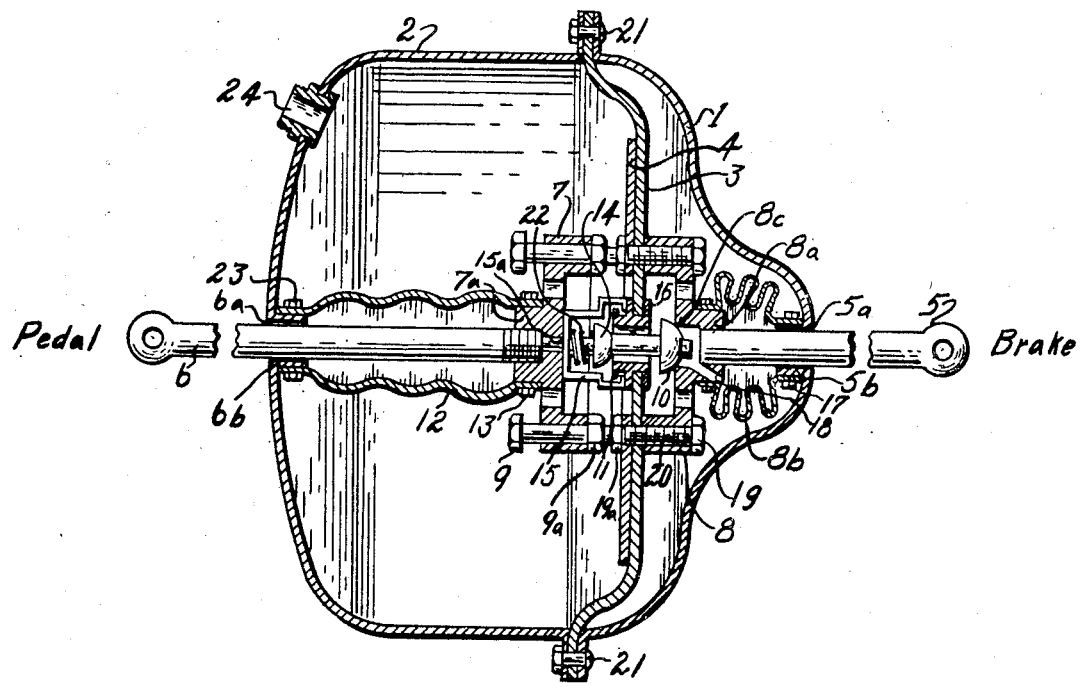
Fig. 1 is a longitudinal section through the servo-motor.
Figure 2:
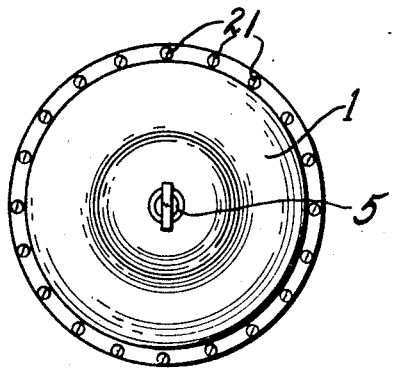
Fig. 2 is an elevation from the right of Fig. 1 but on a smaller scale.

In the drawings, the device is shown as comprising a two part metal casing of which one part 1 is somewhat smaller than the other part 2.

The casing is divided into two compartments by a flexible diaphragm 3, the edges of which are clamped between the flanged edges of the casing parts by means of bolts 21.

The diaphragm 3 is made of a suitable flexible air-tight material and is reinforced by means of an annular concentrically located plate 4 somewhat smaller in diameter than the casing.

Secured to plate 4 on the opposite side of the diaphragm 3 is a spider 8 and to the center of the spider is secured a rod 5 extending from casing part 1 through an axial opening 5$^a$ provided with an internal flange 5$^b$. It is preferred also to provide spider 8 with a central internally threaded boss 8$^a$ into which rod 5 screws. This boss 8$^a$ and flange 5$^b$ provide means to which may be secured as by screws 17 a collapsible sleeve 8$^b$, for the purpose of rendering the compartment in this end of the casing air-tight.

The spider 8 is also provided in its under side with a valve seat 8$^c$ cooperating with a valve 10 and the seat cavity is connected to the inside of sleeve 8$^b$ by a passage 18 in boss 8$^a$.

Spider 8 is preferably secured to plate 4 by bolts 9, whose threaded ends pass through the plate 4, diaphragm 3 and spider 8 and these elements are fixed on the bolts by nuts 19$^a$ and 19, leaving the unthreaded portion of the bolts to serve as guides for the elements in the compartment in casing part 2.

Mounted loosely on bolts 9 on the opposite side of the diaphragm 3 from spider 8 is a second spider 7 whose movement on the bolts is limited by the bolt heads and other nuts 9$^a$. This spider 7 is also provided with a central internally threaded boss 7$^a$ for the reception of the threaded end of a rod 6 extending from casing 2 through an axial opening 6$^a$ provided with an inwardly extending flange 6$^b$. This flange 6$^b$ and boss 7$^a$ furnish means for securing around rod 6 as by screws 13 and 23 a second collapsible sleeve 12 serving to close opening 6$^a$ and render this end of the casing air-tight.

Spider 7 carries on its underside a small yoke 15 secured to the center of the spider by means of a screw 15$^a$, which yoke embraces and is adapted to move with spider a nipple 11 centrally fixed in diaphragm 3 and held in place by a nut 16. This nipple is provided with a central passage furnishing the sole communication between the compartments, while one end of the nipple forms a seat for a valve 14 adapted to close the passage.

Valve 14 and valve 10 are fixed together by providing one with a stem that screws into the other, thus fixing their relative position and the valves are provided with a spring 22 tending to seat both.

Further casing part 2 is provided with a nipple 24 by means of which a conduit may be connected, which conduit is connected at its other end with means for exhausting the air from the casing. A convenient and preferred means is the intake manifold of the internal combustion engine with which most automotive vehicles are provided.

The servo-motor just described is designed to be fixed in suitable fashion to the frame of the vehicle and the rods 5 and 6 connected to the brake system and brake pedal or lever respectively.

The operation of the device is as follows:—

Assuming the parts in the position shown in Fig. 1 and with a suitable suction pump such as the motor connected with nipple 24, the pressure on both sides of diaphragm 3 is equal as the valve 14 is open and the valve 10 closed. When the brakes are to be applied, the rod 6 is drawn to the left by means of the brake pedal and thereby moves spider 7 along bolts 9 until stopped by the heads. In the mean time, yoke 15 has moved the nipple 11 to close valve 14 and then open valve 10. As soon as valve 10 has been opened, outside air rushes into the casing 1 through opening 5ª around rod 5 and passage 18, destroying the equilibrium and causing the diaphragm to move toward the left and draw with it the rod 5, thus applying the brakes.

The pull upon rod 5 depends of course on the area of the diaphragm and the degree of suction produced in the casing.

Release of the brakes is accomplished by reversal of the action described. When the rod 6 moves to the right, the valve 10 will close first and cut off communication with the outside air whereupon the valve 14 will open and the pressure in the two compartments will become equalized, allowing the brakes to be released.

Now having described the invention and the preferred form of embodiment thereof, it is to be understood that the said invention is to be limited, not to the specific details herein set forth but, only by the scope of the claim which follows.

We claim:—

Brake applying means comprising a closed cylindrical casing, a diaphragm dividing said casing into two compartments and having fixed to one side and spaced therefrom a spider, a rod secured to said spider and extending through one of said compartments and loosely through the adjacent casing wall, said rod being enclosed in a flexible sleeve fixed air-tight to said spider and around the opening in said wall whereby to seal said compartment, a passage-way from within said spider into said sleeve, a second spider on the other side of said diaphragm, and in alignment with the first, said spiders being movable with respect to each other, a rod fixed to said second spider and extending through said other compartment and through its adjacent casing wall in alignment with the first mentioned rod, a flexible sleeve around said second rod and fixed air-tight to said second spider and around the opening through which said rod extends whereby to seal said compartment, an opening through said diaphragm within said spider, a double valve member adapted to close said opening and also to close the first mentioned passage, said double valve member being provided with a stem of such length as to open one of said valves when the other is seated, spring means adapted to seat said valve to close the first mentioned passage, means for moving the second mentioned rod and the spider attached thereto, means connected to said last mentioned spider to move said diaphragm whereby to seat the valve in the opening therein and open the said passageway normally closed by the other portion of said valve and means adapted to connect the chamber thru which said second rod passes to an exhaust means.

DORSEY G. DUTY.
ROY P. SKERRITT.